United States Patent [19]

Possati et al.

[11] Patent Number: 5,157,845
[45] Date of Patent: Oct. 27, 1992

[54] DEVICE FOR CHECKING LINEAR DIMENSIONS OF PARTS

[75] Inventors: Mario Possati, Bologna; Carlo Dall'Aglio, Volta Reno Di Argelato, both of Italy

[73] Assignee: Marposs Societa' Per Azioni, S. Marino di Beutivoglio, Italy

[21] Appl. No.: 466,376
[22] PCT Filed: Sep. 12, 1988
[86] PCT No.: PCT/EP88/00831
§ 371 Date: Mar. 15, 1990
§ 102(e) Date: Mar. 15, 1990
[87] PCT Pub. No.: WO89/03507
PCT Pub. Date: Apr. 20, 1989

[30] Foreign Application Priority Data

Oct. 9, 1987 [IT] Italy ................... 3637 A/87
Dec. 23, 1987 [IT] Italy ................... 3736 A/87

[51] Int. Cl.⁵ ............................ G01B 7/12
[52] U.S. Cl. ........................ 33/544; 33/542; 33/551; 33/555.1
[58] Field of Search ........... 33/544, 544.5, 542.1, 33/DIG. 13, 542, 543, 551, 553, 554, 555.1, 544.3

[56] References Cited

U.S. PATENT DOCUMENTS

| | | | |
|---|---|---|---|
| 2,499,033 | 2/1950 | Oberholtzer | 33/DIG. 13 |
| 3,729,829 | 5/1973 | Lange et al. | 33/DIG. 13 |
| 4,301,677 | 11/1981 | Fisher | 33/542 |
| 4,306,455 | 12/1981 | Selleri | 33/542 |
| 4,339,879 | 7/1982 | Selleri | 33/544.5 |
| 4,417,400 | 11/1983 | Dall'Aglio | |
| 4,447,960 | 5/1984 | Golinelli et al. | 33/544.5 |
| 4,493,153 | 1/1985 | Esken | 33/542 |
| 4,884,346 | 12/1989 | Cook | 33/542 |
| 4,910,877 | 3/1990 | Sokol | 33/DIG. 13 |
| 4,993,163 | 2/1991 | Possati et al. | 33/542 |
| 5,040,305 | 8/1991 | Cusack | 33/544 |

FOREIGN PATENT DOCUMENTS

| | | |
|---|---|---|
| 0129741 | 1/1985 | European Pat. Off. . |
| 3003370 | 1/1982 | Fed. Rep. of Germany . |
| 3125959 | 5/1982 | Fed. Rep. of Germany . |
| 3207837 | 11/1982 | Fed. Rep. of Germany . |
| 52-35662 | 3/1977 | Japan . |
| 0025862 | 2/1979 | Japan ........... 33/DIG. 33 |
| 1025998 | 6/1983 | U.S.S.R. ........ 33/DIG. 13 |
| 2065886 | 7/1981 | United Kingdom ..... 33/DIG. 13 |

Primary Examiner—Thomas B. Will
Attorney, Agent, or Firm—Stevens, Davis, Miller & Mosher

[57] ABSTRACT

Device comprising a support (21-23) with a seat (27, 27') housing a measuring cell (24, 24') having a feeler (6, 6') adapted to contact the part to be checked and with a strain gauge transducer (12-17) for detecting the feeler position. In order to obtain a device with very small overall dimensions and high accuracy and repeatability, the measuring cell (24, 24') comprises an integral element (1) having a support portion (2) fixed in the seat (27, 27'), a free portion (4, 4') carrying the feeler (6, 6') and an intermediate resiliently deformable portion (3, 3'), whereto there is fixed a strain gauge (13) of the transducer (12-17).

14 Claims, 2 Drawing Sheets

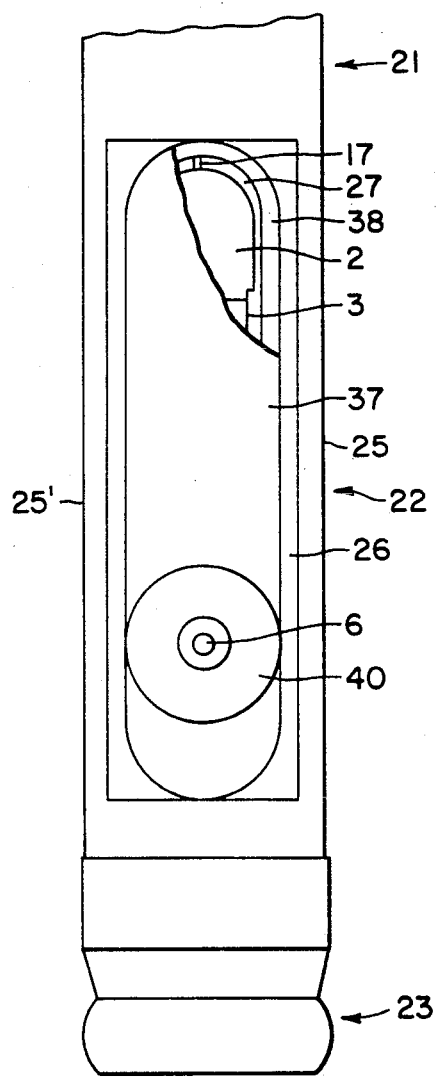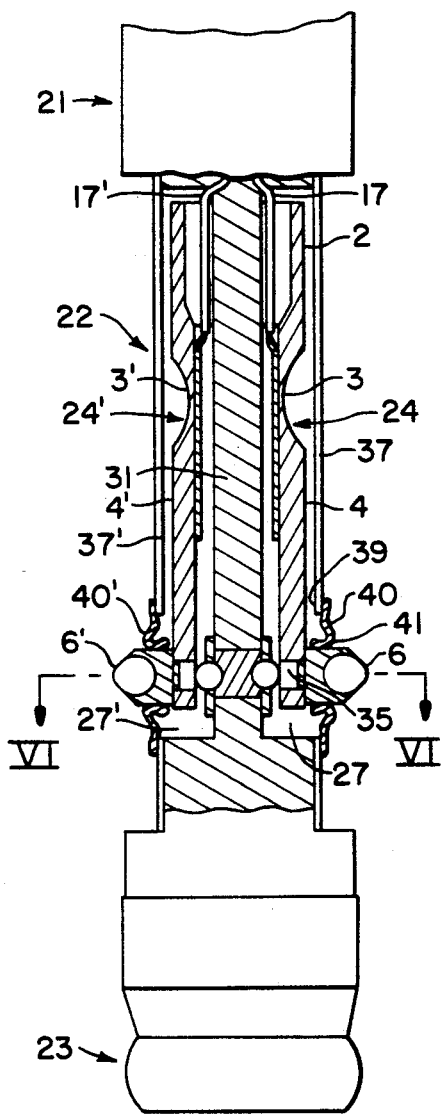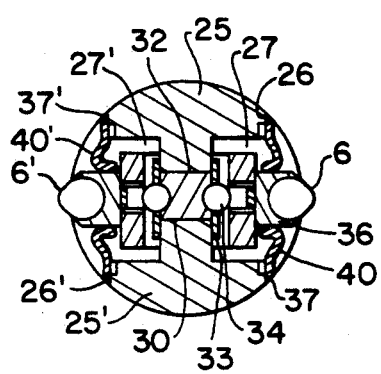

DEVICE FOR CHECKING LINEAR DIMENSIONS OF PARTS

TECHNICAL FIELD

The invention relates to a device for checking linear dimensions of parts, with a support structure defining a seat and a measuring cell fixed in a determined position in the seat, the measuring cell having a feeler adapted to touch the part to be checked, a flexible portion for permitting displacements of the feeler and transducer means comprising at least a strain gauge fixed to said flexible portion.

BACKGROUND ART

European patent application EP-A1-0129741 describes a device comprising a flexible lamina secured in a seat of a support and carrying elements of a strain gauge transducer. The lamina has a free end cooperating with a feeler rigidly coupled to a bushing movable within a guide body fixed to the seat. The seat is sealingly closed by a rigid cover, a sealing ring arranged between the cover and the support and a resilient seal—having an opening for the feeler passage—coupled to the cover, the feeler and the guide body.

The known device can be manufactured with rather small overall dimensions, but the somewhat high number of constituent elements prevents the reduction of the overall dimensions, involves complex and long assembling operations and negatively affects the accuracy and repeatability of the measurements, that also suffer from the presence of a sliding contact between the feeler and the lamina.

Japanese patent application published under No. 52-35662 discloses a strain gauge device for checking the deformation of vessels subjected to high pressures. The device comprises a substantially C-shaped element, apparently obtained from a single piece, with a section of reduced thickness, so as to be resiliently deformable, whereto there are fixed strain gauges. The device is not provided with a real frame or support, even if there is a ring adapted to cooperate with the arms of the element for keeping them at a determined distance.

During the measurement, the ring is removed and the ends of the integral element, that act as feelers, contact relevant points of the vessel to be checked.

This device with two feelers is provided for very particular applications, for which manual operations by a rather skilled operator are necessary. Anyway, the accuracy and repeatability are inevitably poor, due to the manner in which the device cooperates with the vessel.

German patent application DE-A-3003370 shows in FIG. 2 a device for checking linear dimensions of parts comprising a support body that defines a seat and a measuring cell fixed within the seat. The measuring cell comprises an integral element having a support portion adapted to be coupled to the support body, a movable end portion carrying a feeler and an intermediate flexible portion connecting the support portion with the movable end portion. The intermediate flexible portion, that has substantially the shape of, and operates as a flat leaf spring, carries transducer means constituted by strain gauges. A member defining a protection cover terminates at one end with a coupling portion having a hole for a screw also passing through a hole of the support portion of the integral element, for locking the integral element to the support body.

German patent application DE-A-3207837 shows in FIG. 1 an electronic plug gauge for checking diameters of holes having an arm-set featuring a substantially U-shaped integral member arranged within a substantially cylindrical protection body. The integral member has two flexible portions next to the base of the member and two legs or arms, each of which is movable about a rotation axis defined by the corresponding flexible portion. Fixed at the ends of the movable arms are feelers for contacting a diametrically opposite point of the hole. A position transducer comprises two elements respectively fixed to intermediate portions of the movable arms.

DISCLOSURE OF INVENTION

The invention is intended to overcome the drawbacks of the prior art, by permitting the obtainment of a device with possible very small dimensions, easy to assemble, very sturdy, and such as to guarantee high accuracy and repeatability.

According to the invention, a device for checking linear dimensions of parts, comprises a support body defining a seat and a measuring cell fixed in a determined position in the seat. The measuring cell includes a feeler adapted to touch the part to be checked, transducer means providing a signal depending on the feeler position, and a substantially linear integral element having a support portion adapted to be fixed in the seat, a movable portion carrying said feeler and an intermediate portion with reduced thickness, that defines a flexible portion for permitting displacements of the movable portion with respect to the support portion. The transducer means includes a strain gauge fixed to the intermediate portion.

The effects and advantages offered by the invention are that it is possible to carry out measurements of linear dimensions in zones with very poor accessibility and to perform a plurality of simultaneous measurements in points very close to one another, by means of relevant measuring cells carried by one or more supports. The cheapness of the cells makes the maintenance simpler in the case of failures, by rendering advantageous the replacement of a whole cell, rather than its repair.

On the other hand, the small and compact structure of the measuring cells and their sturdiness render failures very unlikely.

Since the measuring cell and the relevant seat can be very small, the manufacturing of measuring devices featuring protection against foreign matter is rendered easier.

The construction of the cell by an integral element, substantially linear, that defines a support portion, a fulcrum and a movable arm, enables the obtainment of very low thermal drift errors and the simplification of the assembling and setting up operations of the measuring devices.

By precision machining of the seat and of the cell, it is possible to manufacture measuring devices not requiring mechanical zero setting operations.

The structure of the measuring cells and the use of strain gauge transducers, besides being intrinsically cheap, permit the use of power supply, processing and indicating electronic units, they too cheap. In fact, it is known that the measuring signals of the strain gauge transducers, even if have the limitation to be rather weak, offer the advantages of involving low noise and of not requiring power supply or processing with alternate currents. Consequently, for example, the electronic units do not necessitate the use of oscillators.

BRIEF DESCRIPTION OF DRAWINGS

The invention is now described in more detail with reference to the annexed drawings, given for exemplary purpose only, relating to a measuring cell and to the application of two similar cells in a comparator plug gauge for checking internal diameters.

FIG. 4 shows a partly sectional view of a part of an electronic plug gauge comprising two cells similar to those of FIGS. 1-3, apart from some variants;

FIG. 5 is a side view, from right to left, of the gauge of FIG. 4; and

FIG. 6 is a section of the gauge of FIGS. 4 and 5, along the plane corresponding to path VI-VI in FIG. 4.

BEST MODE FOR CARRYING OUT THE INVENTION

Figure 1:
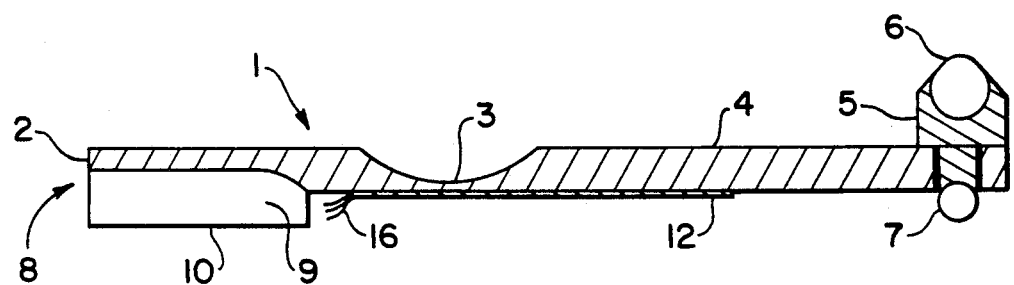
FIG. 1 is a longitudinal section of a measuring cell according to the best mode for carrying out the invention.
Figure 2:
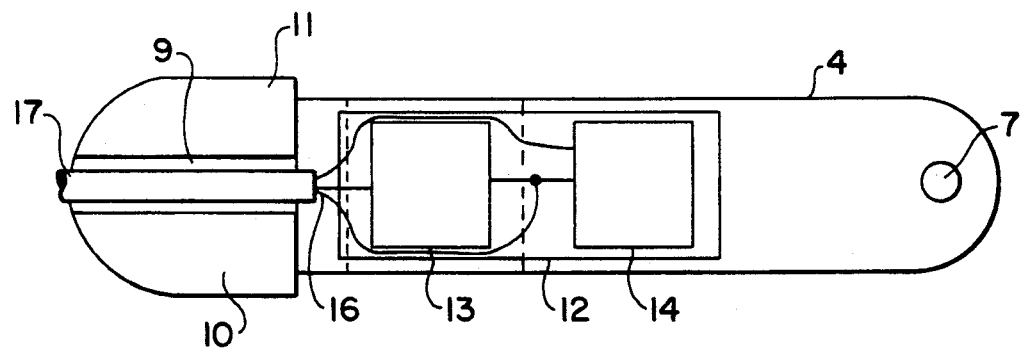
FIG. 2 is a bottom view of the cell of FIG. 1.
Figure 3:
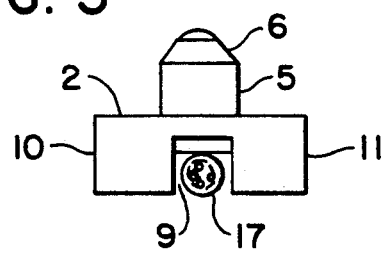
FIG. 3 is a side view, from left to right, of the cell of FIG. 1.

With reference to FIGS. 1 to 3, an integral member or element 1, made of special steel for load cells, comprises a support portion 2 adapted to be secured in a seat, an intermediate portion 3 having reduced thickness and a portion 4 acting as a movable measuring arm and carrying, next to its free end, through a support block 5, a feeler 6 for contacting the part of which it is desired to check linear dimensions, and an end stop and centering element 7 having spherical shape.

Support block 5 is fixed within a through hole of measuring arm 4 by means of a suitable adhesive, that is also used for securing feeler 6 and element 7 to support block 5. Of course, the coupling can also be obtained by welding, or in another manner.

The support portion 2 comprises a heel like part, constituted by a protruding part 8 having a central longitudinal recess 9 arranged between two juts 10, 11, the bases of which are fixed in the seat.

Next to the upper part of support portion 2, the thickness of member 1 decreases due to a transversal lightening, with circular arc outline, that defines portion 3, where the thickness is locally so reduced as to permit—as a consequence of the application to feeler 6, along its axis, of comparatively light forces—small rotational displacements of portion 4, substantially about a transversal rotation axis defined by portion 3. Thus portion 3 can be assimilated to a rotation fulcrum for the movable arm corresponding to free portion 4.

Glued or welded to the lower face of integral element 1 is a strain gauge strip 12, of commercial type, that has two strain gauges 13, 14, one of which, 13, in correspondence with portion 3 and the other, 14, in correspondence with portion 4 (or, according to an obvious variant, with portion 2).

Strain gauges 13, 14, that can also be directly fixed to the integral element, rather than to strip 12, are connected by three conductors 16, housed within a cable 17, in a bridge type circuit, on its turn connected to a power supply, detection and indicating electrical unit. The bridge circuit and the electrical unit are not shown, because they are commonly used in strain gauge devices.

As appears from FIGS. 2 and 3, a portion of cable 17 is housed within recess 9 of the heel shaped part 8.

The structure shown in FIGS. 1 to 3 permits manufacturing very small measuring cells. For example, a cell prototype has been made including an integral element 1 having the following features : 16 mm length; movable arm 4 with 3 mm width; 1.5 mm thickness in correspondence with portion 2 and heel 8; minimum thickness of 0.15 mm in correspondence with portion 3; 0.95 mm thickness in correspondence with portion 4; distance of 9 mm between the rotation axis defined by portion 3 and the geometric axis of feeler 6. This prototype of measuring cell is also characterized by a measuring force (force between feeler 6 and the part) variable between $-0.75$ and $+0.75$ N, in a measurement range from $-150$ to $+150$ um.

Cells similar to that of FIGS. 1 to 3 can be used both in measuring devices with a single feeler and in devices with a plurality of feelers for checking one or more linear dimensions.

FIGS. 4 to 6 refer to a plug gauge comprising two measuring cells for checking the diameter of a hole. The illustrated plug gauge is adapted for applications in transfer lines or, more generally, for automatic type checkings, but the invention offers advantages at least in part common for both manual and automatic plug gauges. Particularly important among these advantages are the possibility of manufacturing plug gauges with two or more pairs of feelers for checking small diameter holes (for example 8 mm diameter) and at a high depth (for example of several tens of millimeters).

The gauge of FIGS. 4 to 6 comprises a support and protection structure or nosepiece, of which a first portion 21, an intermediate portion 22 and an end portion 23 are visible in the figures. End portion 23 has a guide end and can be substantially solid, while the first portion 21 and intermediate portion 22 have several recesses.

In particular, first portion 21 can have a tubular shape, for reducing the gauge weight and housing the cables 17, 17' of the two measuring cells 24, 24' fixed to intermediate portion 22.

Intermediate portion 22 has two cylindrical surface sections 25, 25' having a diameter slightly smaller than the maximum diameter of end portion 23. With reference to FIG. 6, the two sections 25, 25' are oppositely arranged along a direction transversal to the gauge longitudinal axis, while two chamfered surfaces or shoulders 26, 26' are oppositely arranged along a transversal direction perpendicular to the preceding one. In correspondence with surfaces 26, 26', intermediate portion 22 defines two seats 27, 27', housing measuring cells 24, 24', respectively. Since measuring cells 24, 24' are identical to each other and are symmetrically arranged with respect to a geometric plane passing through the gauge longitudinal axis, only the arrangement of cell 24 is now described. Moreover, as far as cell 24 is concerned, only the differences with respect to the cell of FIGS. 1 to 3 are described in detail.

Seat 27, as seen in its top view (FIG. 5), has a shape substantially corresponding to that of cell 24, with a slightly larger width for permitting the insertion of the cell in the assembling phase and, during the operation, the movement of the movable portion or arm 4 about the portion 3 defining the rotation fulcrum.

Fixed within a hole 30 obtained in the longitudinal portion 31 connecting sections 25, 25' is an element 32 that supports, also by means of a small plate 33, a ball 34 that can cooperate with movable arm 4 in correspondence with the end of a cylindrical hole 35 housing a block 36 supporting feeler 6.

Seat 27 is sealingly closed by a flat metal lamina 37, the edges of which are glued or welded in a recess 38 obtained in the chamfered surface 26 next to the recess defining seat 27. Part of lamina 37 is not shown in FIG. 5, for rendering visible recess 38. Lamina 37, that is made of steel for springs and has a thickness of 0.2 mm, defines a hole 39 for the passage of feeler 6.

The external edge of a resilient seal 40, made of rubber, is glued or vulcanized onto the upper face of lamina 37, next to the edge of hole 39.

Seal 40 defines a central hole for the passage of feeler 6 and in correspondence with this hole has an annular portion 41 that is glued or vulcanized onto block 36. The part of seal 40 between the external edge and the annular portion has a thickness of 0.4 mm and is shaped so as to permit the measurement displacements of feeler 6 by applying an elastic reaction at least an order of magnitude smaller than the force due to the resilient deformation of portion 3.

Lamina 37, due to its flat shape and the fixing along all its periphery, does not undergo substantial deformations, but its use and that of seal 40 permit the sealing of seat 27 with a very small room expense.

Apart from feeler 6 and a portion of block 36, cell 34 (in particular the relevant integral element) is completely housed within the room defined by seat 27, metal plate element 37 and resilient seal 40. Therefore cell 24 is very effectively protected against impacts and contamination by foreign matter.

The measurement stroke of feeler 6 is limited due to the contact between ball 34 and the surface of movable arm 4 that delimits hole 35.

Ball 34 and hole 35 are also important in the assembling phase for accurately defining the position of cell 24 within seat 27. For this purpose, after having applied quick setting adhesive onto support portion 2 of cell 24 and/or onto the zone of seat 27 provided for housing said portion 2, cell 24 is immediately inserted, possibly by a tool, into seat 27. Then, by acting onto feeler 6, first reference means, constituted by the edge of hole 35, are displaced to steadily cooperate with second reference means, defined by ball 34. After a time sufficient to guarantee the adhesive setting, feeler 6 can be released. For cell 24', one can act in a similar way.

By this method, the obtainment of the alignment of the feelers of cells 24, 24' along a diametral line is greatly simplified and basically only depends on the positioning accuracy of balls 34, 34', that can be kept high without particular technical and economic problems.

The exact alignment of cells 24, 24' along the longitudinal direction of the plug gauge is not essential and in any case this alignment can be obtained quite satisfactorily by taking as references, for example by means of the already mentioned tool, the side walls of seats 27, 27', that can be manufactured, without any difficulty, with the proper accuracy. The alignment can also be performed through the cooperation between suitable additional mechanical abutments obtained in seats 27, 27' and portions 2, 2'.

Besides avoiding, through the described method, the need of adjustment devices to be used (when the gauge is already assembled) for aligning feelers 6, 6' of cells 24, 24' along a diametral direction of the plug gauge (and thus of the part), the structure of measuring cells 24, 24' can be made very simple, without using devices for adjusting feelers 6, 6' along the radial direction.

In fact, if the depth of seats 27, 27'—or, more exactly, the distance of the surfaces of seats 27, 27' onto which portions 2 are fixed from the plug gauge axis—and the rest position of feelers 6, 6' with respect to portions 2, 2' are accurately obtained, the above described assembling method guarantees the obtainment of the radial position of feelers 6, 6' with respect to the plug gauge axis with almost identical accuracy.

Therefore, after its assembling the plug gauge can be used without any need of performing mechanical zero setting operations.

We claim:

1. Device for checking linear dimensions of parts, with a support structure (21-23) defining a seat (27) and a measuring cell (24) fixed in a determined position to the seat (27), the measuring cell (24) comprising: a feeler (6) adapted to touch the part to be checked; a substantially linear integral element (1) having a support portion (2) adapted to be fixed to the seat (27), a movable portion (4) carrying said feeler (6) and an intermediate portion (3) with reduced thickness, that defines a flexible portion for permitting displacements of the feeler (6); and transducer means including at least a strain gauge (13) fixed to said flexible portion, characterized in that said flexible portion is substantially adapted to define a rotation axis for permitting rotational displacements of the movable portion (4) with respect to the support portion, whereby said flexible portion is assimilable, substantially, to a rotation fulcrum for the movable portion.

2. A device according to claim 1, wherein the transducer means comprise a cable (17) and wherein said support portion (2) comprises two protruding parts (10, 11) adapted to be fixed in the seat (27) and a recess (9) for the cable passage.

3. A device according to claim 1, wherein said support portion (2) is glued in the seat (27).

4. A device according to claim 1, wherein the support portion (2) has a thickness greater than the intermediate portion (3) and the movable portion (4).

5. A device according to claim 1, wherein said integral element (1) is made of steel.

6. A device according to claim 1, wherein the transducer means comprise a strip (12) carrying said strain gauge (13) and a further strain gauge (14), the strip (12) being fixed to the integral element (1).

7. A device according to claim 1, wherein the transducer means comprise a further strain gauge (14) fixed to the integral element (1) in correspondence with a portion (4) chosen between the movable portion (4) and the support portion (2).

8. A device according to claim 1, wherein said seat (27) has a predetermined depth and defines a base adapted to provide an abutment for the rest position of the feeler (6), the feeler (6) having, in said rest position, a determined distance from said base.

9. A device according to claim 1, for checking internal diameters, of parts, wherein the support structure (21-23) defines a second seat (27'), the device including a second measuring cell (24') fixed to the second seat (27').

10. A device for checking linear dimensions of parts, including a support structure (21-23) defining a seat (27) and a measuring cell (24) fixed in a determined position to the seat (27), the measuring cell (24) comprising: a feeler (6) adapted to touch the part to be checked; a substantially linear integral element (1) having a support portion (2) adapted to be fixed to the seat (27), a movable portion (4) carrying said feeler (6) and an intermediate portion (3) with reduced thickness, that defines a flexible portion for permitting displacements of the feeler (6), the flexible portion being substantially adapted to define a rotation axis for permitting rotational displacements of the movable portion (4) with respect to the support portion; and transducer means including at least a strain gauge (13) fixed to said flexible portion; and wherein first and second reference means (7; 34, 35) are associated with the seat (27) and said movable portion (4), respectively, and are arranged in correspondence with said feeler (6) for obtaining a positioning of the feeler (6) with respect to the seat (27) and permitting the subsequent fixing of the support portion (2) to the seat (27).

11. A device according to claim 10, wherein the first and second reference means comprise a spherical surface (34) and a cylindrical hole (35).

12. A device according to claim 10, wherein the first and second reference means (34, 35) are adapted to cooperate with each other, during the device operation, for limiting the displacements of said movable portion (4).

13. A device for checking linear dimensions of parts, including a support structure (21-23) defining a seat (27) and a measuring cell (24) fixed in a determined position to the seat (27), the measuring cell (24) comprising: a feeler (6) adapted to touch the part to be checked; a substantially linear integral element (1) having a support portion (2) adapted to be fixed to the seat (27), a movable portion (4) carrying said feeler (6) and an intermediate portion (3) with reduced thickness, that defines a flexible portion for permitting displacements of the feeler (6), the flexible portion being substantially adapted to define a rotation axis for permitting rotational displacements of the movable portion (4) with respect to the support portion; and transducer means including at least a strain gauge (13) fixed to said flexible portion; and wherein said seat (27) is sealingly closed by a metal plate element (37) fixed to the support structure (21-23) and a resilient seal (40) fixed to the metal plate element (37) and to the feeler (6), the metal plate element (37) and the resilient seal (40) defining relevant holes (39) for the passage of the feeler therethrough.

14. A device according to claim 13, wherein said integral element (1) is completely housed within the room defined by said seat (27), metal plate element (37) and resilient seal (40).

* * * * *